Oct. 15, 1946.　　　　C. W. MOTT　　　　2,409,511

OVERLOAD RELEASE FOR ROCKABLE ARMS

Filed Nov. 20, 1944

Inventor:
Carl W. Mott,
By Paul O. Pippel
Attorney.

Patented Oct. 15, 1946

2,409,511

UNITED STATES PATENT OFFICE 2,409,511

OVERLOAD RELEASE FOR ROCKABLE ARMS

Carl W. Mott, La Grange, Ill., assignor to International Harvester Company, a corporation of New Jersey Application November 20, 1944, Serial No. 564,377

1 Claim. (Cl. 74—599)

This invention has to do with rockable arms of the character for transmitting force to or from shafts and the like, and relates more particularly to a yieldable overload device incorporated into the structure of the arm.

One of the objects of this invention is the provision of a novel rockable arm having root and arm components articulately connected to facilitate relative movement therebetween upon the application of a force of overload proportions to the arm component for rocking the structure, together with yieldable means for normally maintaining the components in fixed relation.

The invention further contemplates and has for one of its objects the provision of an overload device employed between the parts of a multi-part rockable arm and wherein there is a hinged connection between the parts facilitating separation of portions respectively upon the parts and spaced sufficiently distantly from the hinged connection for adapting the employment of a relatively light spring for normally constraining the separable portions against separation and thereby normally maintaining the parts of the arm in rigid assembly.

Figure 1:
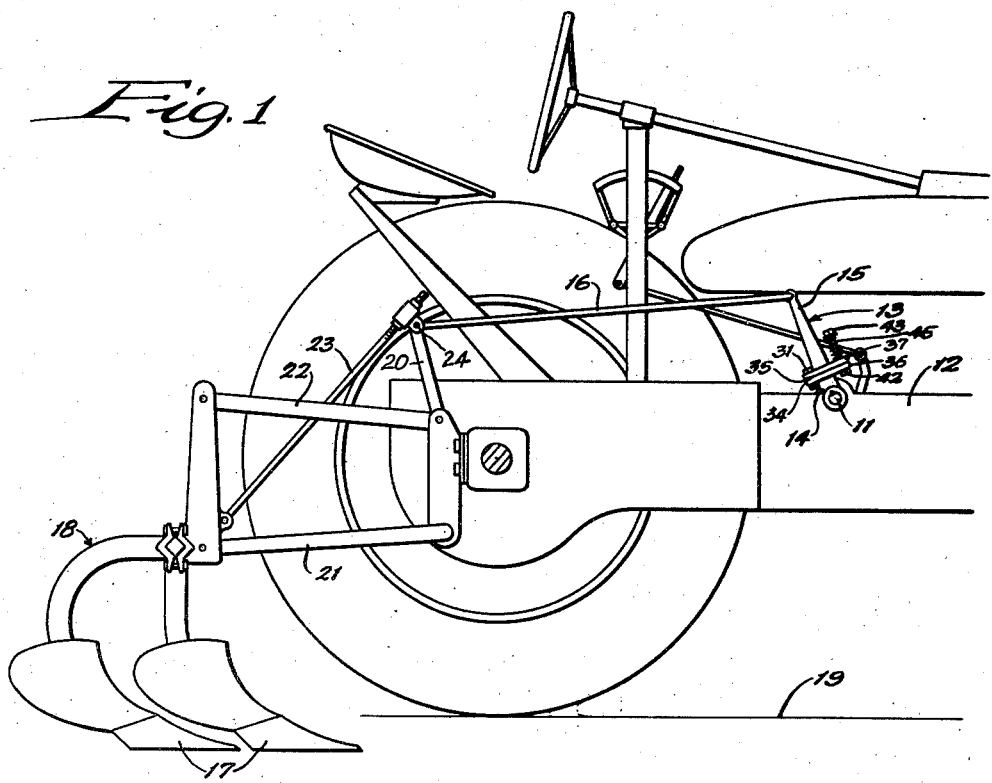
Figure 2:
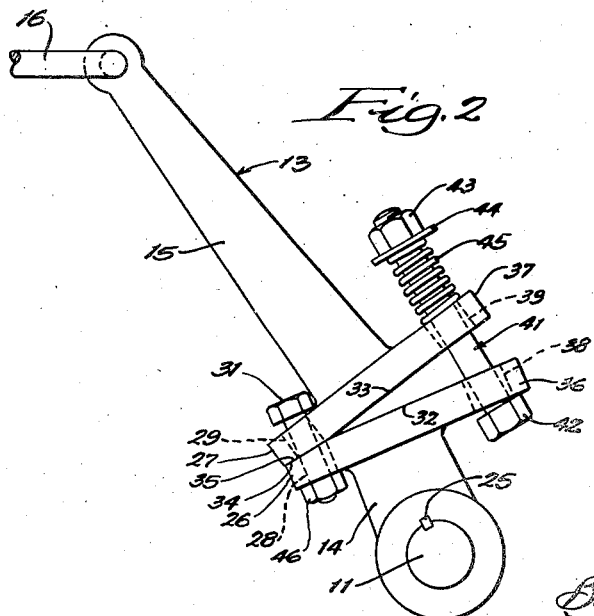

The above desirable objects and other specific objects will become more fully comprehended after reading the ensuing description and examining the annexed drawing, wherein:

Fig. 1 is a fragmentary side elevational view illustrating the rear portion of a farm tractor having an overload release rock-shaft arm embodying the principles of the present invention mounted thereon; and Fig. 2 is a side elevational view of the rock-shaft arm of Fig. 1 shown enlarged, and with the parts thereof in the position occupied when released by the application of an overload force.

The tractor shown in Fig. 1 has a power-operated rock-shaft 11 which extends transversely across the tractor frame or body 12 and has rock-shaft arm structures 13 connected to opposite of its ends for rotation therewith. Only one of the rock-shaft arm structures is illustrated in the drawing. Each arm structure 13 comprises a root portion 14 and an arm 15 normally axially aligned with the root portion 14 and projecting radially from the rock-shaft 11.

When the rock-shaft 11 is rotated clockwise from the position shown in Fig. 1, the arm structure 13, which is constrained to rotate therewith, will exert a forward pull upon a rod 16 for raising plow bottoms 17 of an implement 18 from the ground-working position shown into a transport position where these plow bottoms will be above the ground surface 19. These plow bottoms are suitably mounted upon the outer or back ends of parallel links 21 and 22, which have pivotal connections with the body of the tractor at their front ends. The back ends of the parallel links and the plow bottoms are connected with the rod 16 by a lift rod 23, and a pivotal connection 24 between these rods 16 and 23 is supported at the upper end of a rigid arm 20 pivotally connected with the tractor body at its lower end.

In Fig. 2 the arm structure 13 can be seen to have a keyed connection 25 between its root portion 14 and the rock-shaft 11. It is the purpose of the overload device incorporated into the arm structure to prevent excessive sudden strain upon this keyed connection should the rock-shaft 11 be rotated suddenly by the power drive therefor for lifting an unusually heavy implement 18. The overload release device comprises hinge portions in the form of ears 26 and 27 respectively upon the parts 14 and 15. These laterally projecting portions or sections contain holes 28 and 29, which are oversize with respect to the shank of a bolt 31 which they receive. When end faces 32 and 33 of the members 14 and 15 are disposed in flatwise abutting relation, as illustrated in Fig. 1, opposed faces 34 and 35 of the extensions 26 and 27 are disposed in diverging relation; see Fig. 1. Constraining sections or parts in the form of ears 36 and 37 project from the root and arm portions 14—15 of the structure 13 oppositely from the projecting parts 26 and 27. Holes 38 and 39 are also formed in these extensions 36 and 37, and these holes are oversize with respect to the shank of a bolt 41 which they receive. The head 42 of this bolt bears against the under side of the section 36, while a nut 43 and a washer 44 maintain a helical spring 45 in compressed relation against the upper side of the section 37. Force is exerted by the spring 45 upon the upper side of the section 37 and causes the bolt head 42 to press upwardly against the under side of the section 36 even when these two sections 36 and 37 are in the closed formation illustrated in Fig. 1, which is determined by the faces 32 and 33 (which serve as stop means) abutting together. The spring 45 is of sufficient strength to normally maintain the sections 36 and 37 in their contiguous relation and in this manner cooperates with the hinged connection comprising the bolt 31 for maintaining the portions 14 and 15 of the arm structure in rigid assembly. It will be noted in Fig. 1 that when the faces 32 and 33 of the arm structure components are disposed flatly together, or when the overload release device is in unreleased condition, the head of the bolt 31 and the nut 46 thereon respectively virtually engage the faces of the sections 27 and 26 disposed in opposed relation therewith. The diverging faces 34 and 35 leave a space therebetween into which the laterally projecting sections 26 and 27 can move when the device is operated into the release position of Fig. 2.

Normally the overload release device will remain in the condition illustrated in Fig. 1 wherein the faces 32 and 33 are disposed together, and the root and arm portions 14 and 15 are in axial alinement. This unreleased condition of the device prevails during normal lift of implements such as 18. In the event of the attachment of an unusually heavy implement to the tractor or the association of any unusually heavy load to the outer end of the arm structure 13 the reactive torsional force applied through this structure to the rock-shaft 11 will be cushioned and more gradually applied through the spring 45 as it is compressed pursuant to relative pivotal movement of the structure components 14 and 15 at their hinged connection 28—29—31 and the separation of the constraining sections 36 and 37. Injury to the parts through which the force couple is transmitted is thereby averted by avoiding impact-like development of the force. Upon the termination or sufficient diminution of the force, the spring 45 will automatically reestablish the unoperated condition of the overload device.

Having thus described a preferred embodiment of the invention with the view of clearly illustrating the same, I claim:

A rockable force-transmitting arm structure comprising a root portion adapted for rocking about an axis, an arm portion disposed in end-to-end relation with said root portion, the adjacent ends of said arm and root portions having end face portions normally resting against one another, said arm portion having ears projecting laterally of and oppositely from its said end portion, said root portion having ears projecting laterally of and oppositely from its said end portion and respectively paired with the ears of said root portion, each pair of said ears having axially registering openings of which the axes extend lengthwise of the arm structure, the opposed faces of one pair of said ears being spaced apart while said end faces of the arm and root portions are resting against one another, a bolt shank under-size in respect to and disposed within the openings in said one pair of ears, a second bolt shank under-size in respect to and disposed within the openings of the other pair of ears and having a portion extending outwardly through one of the openings associated therewith lengthwise of the arm structure, a helical spring disposed about said extending bolt shank portion and reacting expansively therebetween, and one of the ears in said other pair for urging the ears of such pair together and normally maintaining the end faces of said arm and shank portions in the relation resting against one another but being compressible pursuant to rocking of the arm portion relatively to the shank portion in a manner incurring separation of said end faces and engagement of the opposed faces of the one pair of ears.

CARL W. MOTT.